April 21, 1936.  F. KORTLANDT  2,038,511
FLOW METER
Filed Nov. 12, 1934
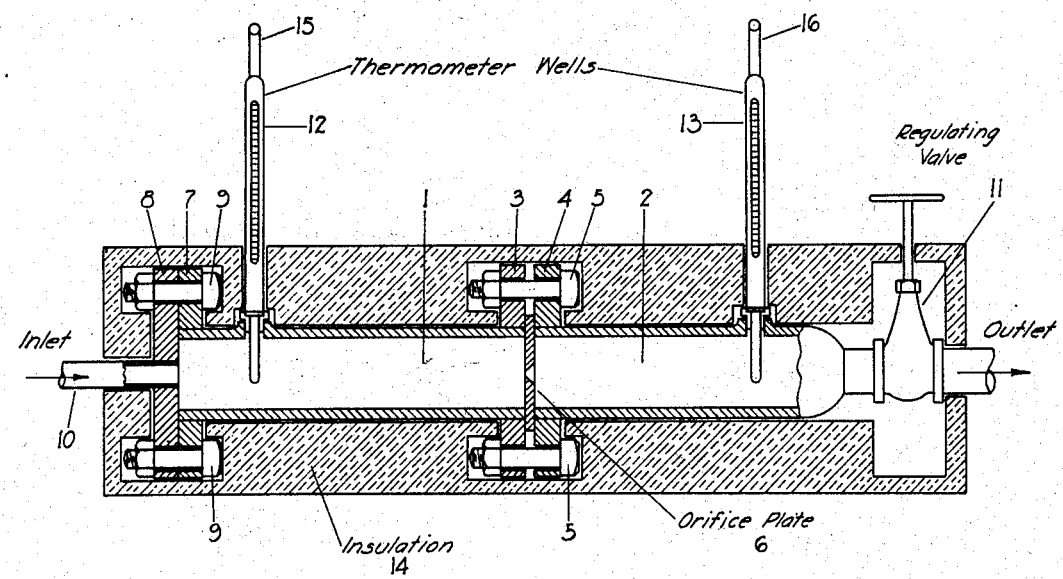
Fig. I
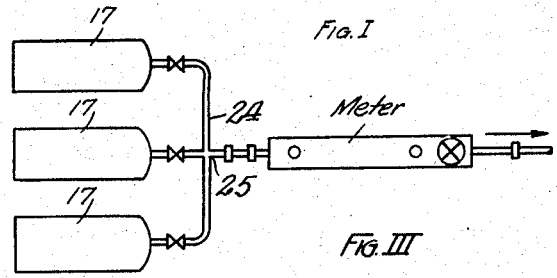
Fig. III
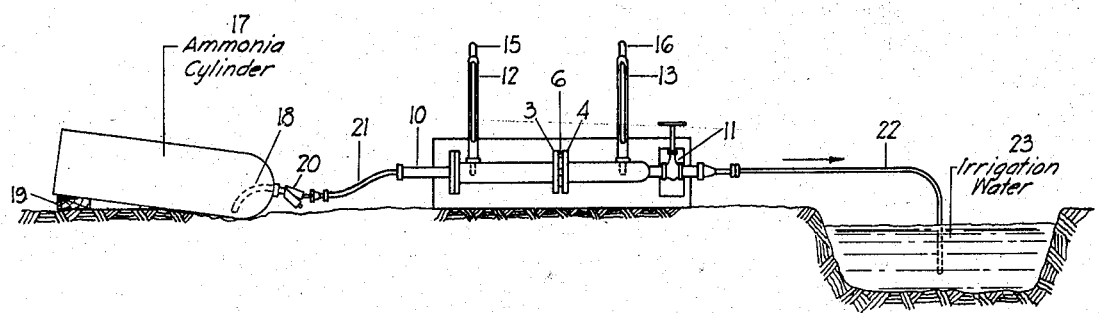
Fig. II
Inventor: F. Kortlandt
By his Attorney: H. Birch Patented Apr. 21, 1936

2,038,511

UNITED STATES PATENT OFFICE 2,038,511

FLOW METER

Felix Kortlandt, Pittsburg, Calif., assignor to Shell Development Company, San Francisco, Calif., a corporation of Delaware Application November 12, 1934, Serial No. 752,620

3 Claims. (Cl. 73—167)

This invention is more particularly concerned with a metering device for liquids under pressure equal to their vapor pressure.

Recently ammonia has been added to irrigation waters for the purpose of fertilizing growing crops. Now in order to insure a determined amount of fertilizer being delivered to each tree or plant with a given flow it is necessary that means be provided for gauging and regulating the rate of delivery of the ammonia to the water.

The usual practice is to convey the ammonia to the place of application as liquid anhydrous ammonia in suitable pressure cylinders.

Existing metering and distributing devices for the ammonia at the necessary low rates of feed consist in the main of a pressure reducing and control valve, an evaporating coil for the ammonia and a gas delivery pipe extending to a point below the level of the water in the irrigation ditch. A pressure gauge consisting of a U tube is connected to the outlet end of the evaporating coil by a suitable T. The flow of ammonia is regulated by adjustment of the pressure reducing valve to produce a previously ascertained pressure at the outlet end of the evaporating coil corresponding to the desired rate of feed.

The above type of meter proves unsatisfactory for several reasons. For example:—the source of heat supply necessary in order to insure the ready evaporation of the ammonia is not always readily available; the apparatus is somewhat delicate requiring very careful handling; and the rate of delivery often varies irrespective of the pressure registered on the gauge due, for example, to the lowering or raising of the level of water in the irrigation ditch.

It is therefore an object of my invention to devise a meter which will be free from the above defects.

The further objects and advantages of my invention will be apparent from the following description of a specific embodiment hereinafter described with reference to the accompanying drawing of which Fig. I is an elevation of the metering device partly in section. Fig. II is a general elevation showing how the meter is utilized. Fig. III shows a plan view of manifolding of cylinders.

Referring in particular to Fig. I, the meter body is composed of two metallic tubes (1) and (2) joined at their inner ends by means of two flanges (3), (4) and by bolts (5). An orifice plate (6) of desired size is held securely in position between the two flanges (3) and (4). The outer end of the tube (1) is fitted with a flange (7) to which is attached an end plate (8) by bolts (9). The end plate (8) is fitted with a short inlet pipe (10), of substantially less diameter than the tube (1). To the outer end of the tube (2) a regulating valve (11) is attached. Towards the outer ends of the tubes (1) and (2) two thermometer wells (12) and (13) are provided. The whole meter is encased in suitable readily removable insulation (14) which is preferably hinged along the longitudinal axis of the meter. Two thermometers (15) and (16) are placed in the wells (12) and (13) when the meter is in use.

The operation of the meter can best be explained with reference to a specific use to which the meter has been placed i. e. the metering of ammonia into a flowing stream of irrigation water. A typical arrangement of the apparatus is shown in Fig. II. A cylinder of liquid anhydrous ammonia (17) fitted with an internal tube (18) is supported in the position shown by means of a block of wood (19), so that ammonia can be continuously withdrawn from the cylinder in the liquid anhydrous state. The cylinder (17) is provided with a shut-off valve (20), the discharge side of which is connected by suitable tubing (21) to the short inlet pipe (10) of the meter. An orifice plate (6) having an orifice of such size that it will permit sufficient liquid anhydrous ammonia to pass through in order to supply the required amount of ammonia to the stream of irrigation water is clamped between the flanges (3) and (4) with its flat face towards the ammonia cylinder. A length of pipe (22) extending into the water of the irrigation (23) is connected to the discharge side of regulating valve (11) by the usual pipe connections. Thin oil or other suitable liquid is placed in the thermometer wells (12) and (13) and the thermometers (15) and (16) placed therein.

The valve (20) of the cylinder of ammonia (17) is opened and the regulating valve (11) closed after the air in the meter has been displaced. The meter will now be full of liquid anhydrous ammonia. The temperature of the ammonia as registered on the thermometer (15) near the inlet end of the meter is noted.

Having decided upon the rate at which ammonia is to be fed into the irrigation water, a table previously prepared is consulted from which the temperature that will be produced on the thermometer (16) with such rate of feed, particular orifice and temperature of the liquid anhydrous ammonia can be ascertained.

For example, in a particular meter of the design shown in the drawing with an orifice plate having an orifice of 0.020 inch diameter with a temperature of 10° C. on thermometer (15), a flow of ammonia of 18 lbs. per hour produced a temperature of —9° C. on the thermometer (16) on the lower side of the orifice.

After noting the temperature which should be registered upon the thermometer (16) at the desired rate of flow the regulating valve (11) is opened until such temperature is actually registered on thermometer (16). It should be borne in mind that the meter takes a minute or two to adjust itself.

The above meter may of course be used to measure the flow of ammonia from several cylinders as shown in Fig. III in which cylinders 17 are connected to a manifold (24), the meter in turn being connected to the outlet pipe (25) of the manifold.

Besides metering ammonia into an irrigation ditch the ammonia may be discharged through a suitable connection into water lines under pressure or into the standpipes or weir boxes which often form a part of an irrigation system. Where discharging into water lines under pressure it is of course necessary that the vapor pressure of the ammonia at the existing temperature be higher than the pressure in the water line, in order for the meter to operate.

The meter is based upon the principle that when a liquid such as anhydrous ammonia stored at a pressure equal to the vapor pressure of the liquid is passed through a small orifice a drop in temperature takes place. It should be noted that the lower the initial temperature of the liquid anhydrous ammonia the higher the temperature drop will be for a given rate of flow.

While I have described my metering device with respect to the metering of liquid anhydrous ammonia it should be understood that the metering device could be readily employed for metering other liquefied gases such as for example, propane or butane.

My meter is especially useful for the metering of small rates of flow. For example, ammonia deliveries at flow rates within the range of 12 lbs. to 170 lbs. per hour have been made.

I claim as my invention:

1. Apparatus for metering liquid anhydrous ammonia into water comprising a pressure vessel containing liquid anhydrous ammonia, a conduit leading from said vessel into water, an orifice plate traversely mounted in said conduit, thermometers in the wall of said conduit on each side of said orifice plate and a regulating valve in said conduit on the discharge side of said orifice and at a point further therefrom than the thermometer on said discharge side.

2. A device for metering flow of liquid anhydrous ammonia comprising a jointed conduit, an orifice plate mounted traversely in said conduit at said joint, thermometer wells extending into said conduit on each side of said joint, a flanged inlet piece at one end of said conduit, a regulating valve at the outlet end of said conduit and insulation surrounding said conduit substantially as described.

3. Apparatus for metering liquid anhydrous ammonia into water comprising a pressure vessel containing liquid anhydrous ammonia, a conduit leading from said vessel into water, an orifice plate traversely mounted in said conduit and thermometers in the wall of said conduit on each side of said orifice plate, the rate of flow of said ammonia being determined by the difference between the indications of said thermometers.

FELIX KORTLANDT.